United States Patent
Hisano et al.

(10) Patent No.: US 6,440,545 B1
(45) Date of Patent: Aug. 27, 2002

(54) POWDER FOR USE IN LOWER LAYER OF COATING TYPE MAGNETIC RECORDING MEDIUM

(75) Inventors: Seiichi Hisano, Chiba; Kazuhisa Saito, Okayama; Kazushi Sano, Okayama; Yoshichika Horikawa, Okayama, all of (JP)

(73) Assignee: Dowa Mining Co., Ltd., Tokyo (*) Notice: Subject to any disclaimer, the term of this patent is extended or adjusted under 35 U.S.C. 154(b) by 0 days.

(21) Appl. No.: 09/601,890

(22) Filed: Aug. 9, 2000

(51) Int. Cl.$^7$ ................................................. G11B 5/16
(52) U.S. Cl. .................. 428/216; 428/328; 428/329; 428/336; 428/403; 428/694 BS; 428/900; 427/128; 427/129; 427/130
(58) Field of Search ................. 428/216, 328, 428/329, 336, 403, 694 BS, 900; 427/128–130

(56) References Cited

U.S. PATENT DOCUMENTS

| | | | | |
|---|---|---|---|---|
| 4,629,653 A | * | 12/1986 | Asoi | 428/328 |
| 4,657,813 A | * | 4/1987 | Asoi | 428/328 |
| 5,455,104 A | * | 10/1995 | Sekiguchi | 428/212 |
| 5,496,622 A | * | 3/1996 | Isobe | 428/216 |
| 5,637,390 A | | 6/1997 | Isobe et al. | 428/323 |

FOREIGN PATENT DOCUMENTS

| | | |
|---|---|---|
| JP | 54-84894 | 7/1979 |
| JP | 61-106420 | 5/1986 |
| JP | 4-167225 | 6/1992 |
| JP | 6-60362 | 3/1994 |
| JP | 6-139553 | 5/1994 |
| JP | 6-215360 | 8/1994 |
| JP | 7-78331 | 3/1995 |
| JP | 7-105530 | 4/1995 |
| JP | 7-182649 | 7/1995 |
| JP | 7-282443 | 10/1995 |
| JP | 7-326037 | 12/1995 |
| JP | 7-334835 | 12/1995 |
| JP | 9-255341 | 9/1997 |
| JP | 10-53421 | 2/1998 |
| JP | 10-231126 | 9/1998 |
| JP | 10-340447 | 12/1998 |

* cited by examiner

Primary Examiner—Leszek Kiliman
(74) Attorney, Agent, or Firm—McDermott, Will & Emery

(57) ABSTRACT

A powder for use in the lower layer of a coating magnetic recording medium, comprising acicular particles with a mean major axis length in a range of from 0.01 to 0.5 $\mu$m and a mean minor axis length in a range of from 0.01 to 0.05 $\mu$m, provided that the acicular particles are flat acicular particles which, when cut in a direction perpendicular to the major axis, uniformly exhibit a cross section having a larger width to smaller width ratio of greater than 1, and that the quantity of discharged $H_2O$ at 100° C. is in a range of from 0.1 to 2.0% by weight.

11 Claims, 6 Drawing Sheets

POWDER FOR USE IN LOWER LAYER OF COATING TYPE MAGNETIC RECORDING MEDIUM

TECHNICAL FIELD OF THE INVENTION

The present invention relates to a powder for use in a lower layer of a coating type magnetic recording medium having multilayer structure.

BACKGROUND OF THE INVENTION

In a so-called coating type magnetic recording medium comprising a magnetic layer formed on a support by coating the support with a coating film of magnetic particles dispersed in a binder resin, it is desired to make the magnetic layer thinner to obtain high output characteristics while minimizing noise. To achieve this requirement, there is proposed a coating type magnetic recording medium having a multilayer structure, in which a non-magnetic layer (which is referred to herein as a "lower layer") is provided as a coating film of non-magnetic particles dispersed in a binder resin between the support and the magnetic layer.

As the non-magnetic powder for forming the lower layer, there has been proposed the use of spherical particles of titanium oxide or particles of iron oxide. For instance, in a magnetic recording medium having such a multilayer structure as disclosed in JP-A-Hei6-215360 (the term "JP-A" as referred herein signifies "an unexamined published Japanese patent application"), there are disclosed the characteristic values for cases using acicular hematite ($\alpha$-$Fe_2O_3$), spherical hematite ($\alpha$-$Fe_2O_3$), Co-$\gamma$-$Fe_2O_3$, acicular $TiO_2$, or spherical $TiO_2$. Similarly, JP-A-Hei6-139553, JP-A-Hei7-282443, JP-A-Hei7-326037, and JP-A-Hei7-334835 disclose the characteristic values for cases using acicular $\alpha$-$Fe_2O_3$ for the non-magnetic powder for forming the lower layer. Further similarly, JP-A-Hei7-78331, JP-A-Hei7-105530, JP-A-Hei7-182649, and U.S. Pat. No. 5,496,622 disclose the characteristic values for cases using Co-$\gamma$-$Fe_2O_3$, or still further, for cases using $\alpha$-$Fe_2O_3$. In the aforementioned publications, various names of substances other than the above iron oxide powders which are provided specifically with the characteristic values, are exemplified as other non-magnetic powders usable for the lower layer. The name of iron oxyhydroxide is also included in those of the substances. On the other hand, in JP-A-Hei4-167225 is disclosed a special type of multilayer structure, which is different from the others in that the lower non-magnetic layer is provided thinner than the upper magnetic layer. In the disclosure, evaluation is made on the resistance against flaws, stiffness, and head contact properties for a case using particles of iron oxyhydroxide as the powder for forming the lower non-magnetic layer. Furthermore, U.S. Pat. No. 5,637,390 discloses an example using $\alpha$-FeOOH powder coated with Si and Al as the lower non-magnetic powder, and the surface roughness of the tape using this powder is evaluated therein. The disclosure in JP-A-Hei6-60362 teaches that such iron oxyhydroxide is unfeasible as a powder for use in a lower layer because of its poor dispersibility in binder, and that the use of acicular $\alpha$-$Fe_2O_3$ is recommended.

OBJECT OF THE INVENTION

In the coating type magnetic recording medium having a multilayer structure known thus far, it has been commonly believed that the use of an iron oxyhydroxide powder cannot sufficiently exhibit the advantage of employing the multilayer structure due to the poor dispersibility of the powder in the binder. Accordingly, it is not fully understood what type of iron oxyhydroxide enables the desired function when used as a powder for the lower layer of a magnetic recording medium. In fact, U.S. Pat. No. 5,637,390 discloses the properties of the magnetic recording medium in case of using the iron oxyhydroxide as the powder for the lower layer, however, it does not teach how the variation in the type or the shape of iron oxyhydroxide depending on the difference attributed to the production process of iron oxyhydroxide influences the characteristics of the powder used in the lower layer.

On the other hand, although iron oxyhydroxide is generally produced by oxidizing a suspension of $Fe(OH)_2$, it is well known that a slight fluctuation in the condition of oxidization changes the generating phase as to change the characteristics and the morphology of the resulting product. Accordingly, iron oxyhydroxides known to present not always exhibit the properties suitable as the powder for use in the lower layer above.

Accordingly, an object of the present invention is, in case of employing the powder of an iron oxyhydroxide as the lower layer powder above, to clarify how the physicochemical properties as well as the figure characteristics of the powder influence the surface smoothness, strength, magnetic properties, weather resistance properties, etc., of the magnetic recording medium, and to contribute to the improvement of the magnetic recording medium having a multilayer structure.

SUMMARY OF THE INVENTION

According to an aspect of the present invention, there is provided a powder for use in the lower layer of a coating type magnetic recording medium, comprising acicular particles substantially free from branching and having a mean major axis length in a range of from 0.01 to 0.5 $\mu$m and a mean minor axis length in a range of from 0.01 to 0.05 $\mu$m, provided that the acicular particles are flat acicular particles which, when cut in a direction perpendicular to the major axis, uniformly exhibit a cross section having a larger width to smaller width ratio of 1 or higher, preferably 1.5 or higher, and that the quantity of discharged $H_2O$ at 100° C. is in a range of 2.0% by weight or less.

The flat acicular particles according to the present invention is made of iron oxyhydroxide preferably containing from 0.1 to 30% by weight of either or both of Al and Si, having a specific surface area in a range of from 10 to 300 $m^2/g$ and a tap density of 0.4 $g/cm^3$ or higher, and having a decomposition temperature in air of 210° C. or higher.

In order to produce an iron oxyhydroxide powder consisting of flat acicular particles substantially free from branching according to the present invention, there is employed a method which comprises adding an alkali hydroxide to an aqueous solution of a ferric salt at an equivalent value of 1.0 to 3.5 with respect to $Fe^{3+}$ ion to form precipitates (neutralized precipitates) at a temperature of 5° C. or higher; allowing iron oxyhydroxides to precipitate by holding the resulting suspension at a temperature higher than the former temperature; and separating the resulting precipitated iron oxyhydroxide from the suspension. In this method, flat acicular iron oxyhydroxide solid solutions containing Al (occluded Al) can be obtained by providing Al dissolved in the suspension from which the iron oxyhydroxide is precipitated therefrom, or in the solution prior to the precipitation. Furthermore, flat acicular iron oxyhydroxide covered with an Al compound can be obtained by adding a water-soluble aluminum salt or an aluminate to the suspension containing therein the precipitated iron oxyhydroxide.

PREFERRED EMBODIMENTS OF THE INVENTION

Figure 1:
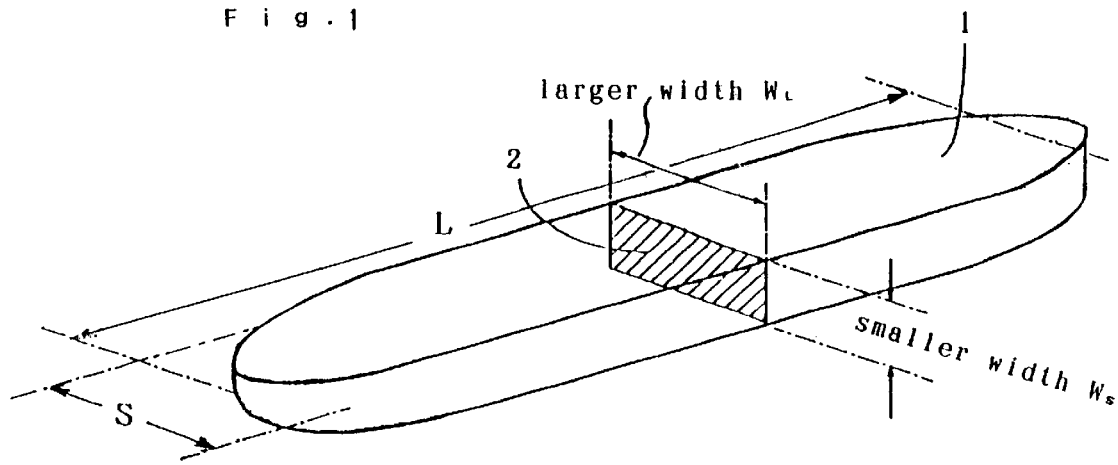
FIG. 1 shows a schematic drawing of a particle provided as an explanatory means to describe the figure of the flat acicular particles according to the present invention.

Originally, the main purpose of providing a non-magnetic layer (lower layer) containing dispersed therein a non-magnetic powder between a support and a magnetic layer is, firstly, to reduce the thickness of the magnetic layer to thereby assure the output in the short recording wavelength regions. and secondly, to achieve superior electromagnetic conversion characteristics such as the erasing characteristics and the overwriting characteristics. To improve such characteristics, the magnetic layer itself must also be efficient to some extent, but the non-magnetic layer provided as the lower layer should play the principal role to enable a smooth and thin magnetic layer coating thereon; that is, the non-magnetic layer itself must have excellent surface smoothness and contribute to the improvement in strength of the magnetic recording medium, and must aid the upper magnetic layer such that the magnetic characteristics may be sufficiently exhibited.

In case of the spherical titanium oxide particles known to present as a powder for the lower layer, it was not obtainable to make more fine, and the tape strength was found to be insufficient as compared with the case of using a powder consisting of acicular particles. Concerning the powder consisting of acicular iron oxide (hematite) particles, on the other hand, it cannot be freed from the problem of insufficient surface smoothness, because intergranular sintering unavoidably occurs during its production.

In the case of forming a coating film comprising iron oxyhydroxide particles dispersed in a binder resin, the surface smoothness, strength, etc., greatly depend not only on the binder resin used therein, but also is influenced by the physico-chemical properties as well as the size and the figure of the iron oxyhydroxide particles. As a powder of iron oxyhydroxide which can accomplish the role of the lower layer as described above, that is, a powder capable of imparting surface smoothness as well as strength to the recording medium and improving magnetic characteristics of the magnetic layer, there can be mentioned a powder of iron oxyhydroxide comprising acicular particles substantially free from branching and having a mean major axis length in a range of from 0.01 to 0.5 $\mu$m and a mean minor axis length in a range of from 0.01 to 0.5 $\mu$m, provided that the acicular particles are flat acicular particles which, when cut in a direction perpendicular to the major axis, uniformly exhibit a cross section having a larger width to smaller width ratio of greater than 1, preferably 1.5 or greater, and that the quantity of discharged $H_2O$ at 100° C. is in a range of from 2.0% by weight or less.

The role which should be accomplished by the lower layer as described above can be more advantageously played by a powder of iron oxyhydroxide comprising acicular particles substantially free from branching and having a mean major axis length in a range of from 0.01 to 0.5 $\mu$m, containing from 0.1 to 30% by weight of either or both of Al and Si, and discharging $H_2O$ at 100° C. at a quantity in a range of from 2.0% by weight or less.

The role of the lower layer above can be played further advantageously by a powder of iron oxyhydroxide comprising acicular particles substantially free from branching and having a mean major axis length in a range of from 0.01 to 0.5 $\mu$m; containing from 0.1 to 30% by weight of either or both of Al and Si; having a specific surface area in a range of from 10 to 300 $m^2/g$, preferably from 40 to 300 $m^2/g$, more preferably, from 40 to 150 $m^2/g$; having a tap density in a range of from 0.3 to 1.2 $g/cm^3$, preferably, from 0.4 to 1.2 $g/cm^3$; and discharging $H_2O$ at 100° C. at a quantity in a range of from 0.1 to 2.0% by weight.

Still more, the role of the lower layer above can be accomplished advantageously by a powder of iron oxyhydroxide comprising acicular particles substantially free from branching and having a mean major axis length in a range of from 0.01 to 0.5 $\mu$m; containing from 0.1 to 30% by weight of either or both of Al and Si; having a specific surface area in a range of from 10 to 300 $m^2/g$; having a tap density of 0.4 $g/cm^3$ or higher; having a decomposition temperature in air of 210° C. or higher, preferably 215° C. or higher; and discharging $H_2O$ at 100° C. at a quantity in a range of from 0.1 to 2.0% by weight.

Further in addition to above, the powder of iron oxyhydroxide according to the present invention preferably has the following properties.

[True Density]

The powder preferably has a true density in a range of from 3.0 to 6.0 $g/cm^3$, and more preferably, from 3.5 to 4.3 $g/cm^3$. In the powder comprising acicular particles according to the present invention, the use of powder having the true density as specified above and having a high tap density advantageously improves the surface smoothness of a tape, because the powder can be more easily compressed in the coated film in case of calendaring the coating during the process of forming the coated tape.
[Crystal Size (Crystallites)]
The crystallite size is preferably in a range of from 10 to 200 Angstrom(Å), preferably, 50 to 150 Å.

Concerning the particles size of the powder, in summary, the powder preferably comprises acicular particles having a mean major axis length in a range of from 0.01 to 0.5 μm and a mean minor axis length in a range of from 0.01 to 0.05 μm with an average axial ratio of from 1 to 30, provided that the acicular particles are flat acicular particles which, when cut in a direction perpendicular to the major axis, uniformly exhibit a cross section having a larger width to smaller width ratio of greater than 1, and consist of crystallites having a size in a range of from 10 to 200 Å. In case of such fine particles, in particular, the aforementioned cross section ratio in the direction perpendicular to the major axis (i.e., in the minor axis direction) and the length of the shortest axis (shortest minor axis length) greatly effect the surface smoothness of the tape, and the surface smoothness is further improved by increasing the cross section ratio in the minor axis direction and reducing the shortest minor axis length. The cross section ratio in the minor axis direction and the shortest minor axis length reflect to the crystallite size and the specific surface area of the powder.

The term "flat acicular particles" as referred herein signifies that the acicular particles have a major axis length to the minor axis length ratio (axial ratio) of preferably 2 or greater, wherein the major axis length means the length along the longitudinal direction and the minor axis length means the maximum length along the transverse direction, and, that said acicular particles are flat particles having a cross section in the minor axis direction cut perpendicular to the major axis exhibit a larger width and a smaller width, wherein the ratio of the larger width to the smaller width (which is referred to in the present specification as "the cross section ratio in the minor axis direction") keeping its ratio substantially uniform in the major axis direction is greater than 1, preferably 1.5 or greater.

Figure 2:
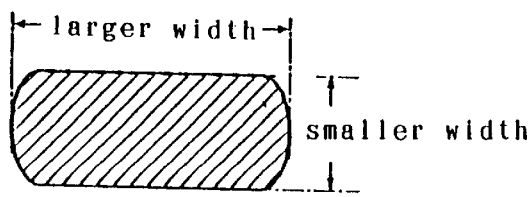
FIG. 2 is a drawing showing another example of the figure of a flat acicular particle, showing a cross section along the minor axis thereof.
Figure 3:
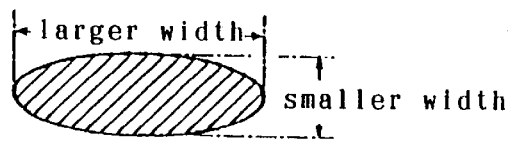
FIG. 3 is another drawing showing another example of the figure of a flat acicular particle, showing a cross section along the minor axis thereof.
Figure 4:
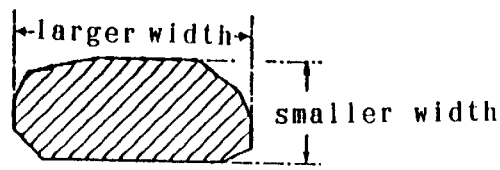
FIG. 4 is another drawing showing another example of the figure of a flat acicular particle, showing a cross section along the minor axis thereof.
Figure 5:
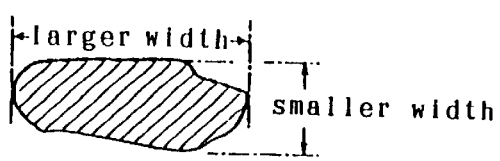
FIG. 5 is another drawing showing another example of the figure of a flat acicular particle, showing a cross section along the minor axis thereof.

In FIG. 1 is a schematic drawing given as a means to explain the flat acicular shape. Referring to FIG. 1, in an acicular body 1 having a maximum length L in the longitudinal direction (i.e., the length of the major axis) and a maximum length S in the transverse direction perpendicular to the longitudinal direction (i.e., the length of the minor axis), the figure of the body can be seen to exhibit a flat shape having a cross section 2 in the minor axis direction cut perpendicular to the major axis with a larger width $W_L$ and a smaller width $W_S$. More specifically, the body may be said to have a morphology similar to a plate (ribbon-like shape) having a width $W_L$ and a thickness $W_S$. However, the flat shape of the cross section 2 in the minor axis direction is not only limited to a rectangular shape as shown in FIG. 1, but can exhibit a capsule-like shape as in FIG. 2, an ellipsoidal shape as in FIG. 3, a polygonal shape as in FIG. 4, or a deformed disk-like shape as shown in FIG. 5. In short, it is required that the cross section ratio in the minor axis direction, i.e., the $W_L/W_S$ ratio, is greater than 1, and preferably, 1.5 or greater. Furthermore, the flat acicular iron oxyhydroxide particles according to the present invention are substantially free from branching.

The powder of iron oxyhydroxide consisting of flat acicular particles having a mean major axis length of from 0.01 to 0.50 μm with an axial ratio of 2 or more as described above, as described in the examples hereinafter, enables a non-magnetic layer with superior surface smoothness, and thereby enables to form thereon a magnetic layer with excellent surface smoothness.

The state of surface treatment of the iron oxyhydroxide powder and the its pH would give an influence to the dispersibility of the powder on forming a coating, and affect to the surface smoothness of the coating. Accordingly, the powder preferably is prepared to yield the properties below in the range specified below.
[Stearic Acid Absorption]
Preferably, the stearic acid absorption is in a range of from 0.1 to 3.0 mg/m$^2$.
[Resin Absorption]
Preferably, the resin absorption is in a range of from 0.5 to 4.0 mg/m$^2$.
[pH]
The powder yields a pH range of from 6 to 11. By controlling the pH, a favorable dispersibility can be obtained on forming the coating as to effectively improve the surface smoothness.

The powder for use in the lower layer according to the present invention can be prepared in accordance with the method for preparing a powder of iron oxyhydroxide below. For instance, the process comprises:

adding an aqueous solution of an alkali hydroxide to an aqueous solution of a ferric salt such as ferric sulfate or ferric chloride at an equivalent value of 1.0 to 3.5 with respect to $Fe^{3+}$ ion to form a precipitate (a neutralized precipitate) at a temperature of 5° C. or higher;

allowing flat acicular iron oxyhydroxide particles to precipitate by holding the resulting suspension containing the neutralized precipitate at a temperature higher than the former temperature; and separating the resulting precipitated iron oxyhydroxide from the suspension by solid-liquid separation.

If we denote the treatment of precipitating iron oxyhydroxide from the suspension containing the neutralized precipitate as "ripening" (or aging) in the present specification, it has been found that, as is described in the examples hereinafter, the cross section ratio in the minor axis direction can be changed by changing the conditions of ripening, for instance, the ripening temperature. Furthermore, a powder of iron oxyhydroxide free from non-crystalline substance can be prepared by this method.

According to the present method, flat acicular particles of iron oxyhydroxide free from branching and having a flattened cross section in the minor axis direction can be obtained as compared with those prepared by other ordinary methods, for instance, a method comprising first preparing a suspension containing colloids of ferric hydroxide by adding an aqueous solution of alkali hydroxide to an aqueous solution of a ferric salt at an amount exceeding the equivalent value, and then performing an oxidation reaction by bubbling an oxygen-containing gas into the suspension at a pH value of 11 or higher and at a temperature of 80° C. or lower; or, a method comprising performing the oxidation reaction by introducing an oxygen-containing gas into a suspension obtained by reacting an aqueous solution of ferric salt and an aqueous solution of an alkali carbonate. Furthermore, the method according to the present invention can be more advantageously carried out as compared with the method of production for an acicular iron oxide (hematite), since it does not incorporate any heating process at high temperatures, thereby free from causing problems attributed to intergranular sintering.

Figure 6:
FIG. 6 is an electron micrograph (at a magnification of 300,000 times) showing the figures of the individual particles of the powder consisting of flat acicular iron oxyhydroxide particles for use in a lower layer of a coating type magnetic recording medium according to the present invention.
Figure 7:
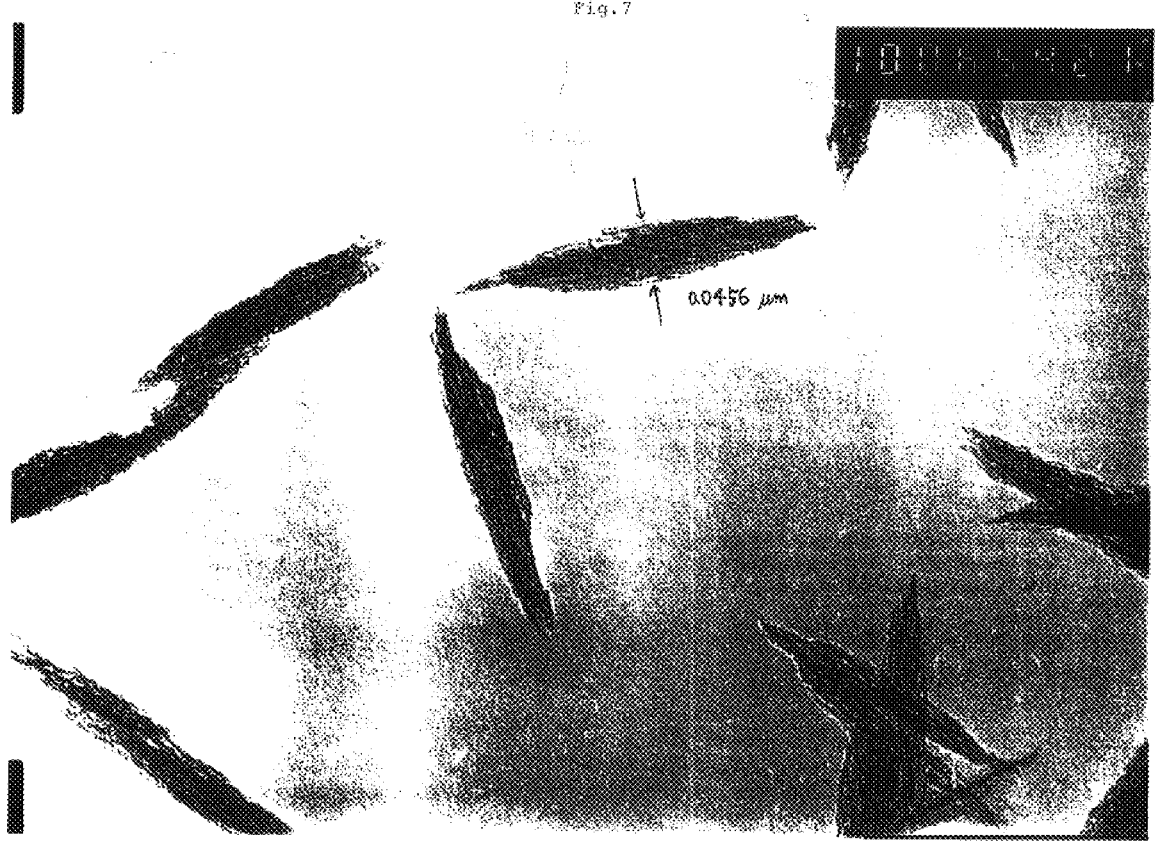
FIG. 7 is an electron micrograph of the same portion of the same specimen shown in FIG. 6, observed from another angle of the sample holder.
Figure 8:
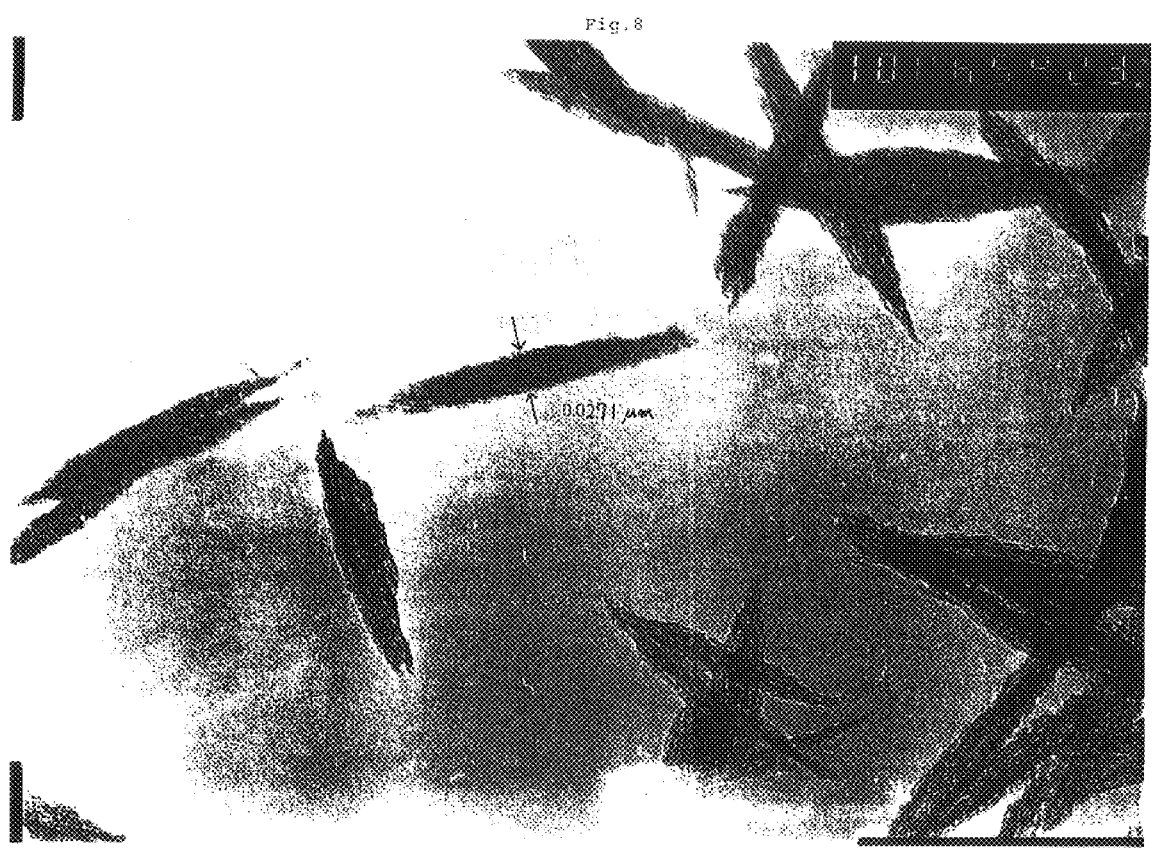
FIG. 8 is an electron micrograph of the same portion of the same specimen shown in FIGS. 6 and 7, observed from another angle of the sample holder.

FIGS. 6 to 8 show the transmission electron micrograph (TEM image: magnification=300,000 times) of the same sample of iron oxyhydroxide powder according to the present invention, in which the same portion of the sample is observed under the same magnification while tilting the sample holder. That is, FIG. 6 shows the micrograph obtained by tilting the sample holder by −45°, FIG. 7 shows the micrograph in case the sample holder is held horizontally (0°), and FIG. 8 is obtained by taking the micrograph for a sample mounted on a sample holder tilted by 45°. By tilting the sample holder, the sample can be observed from different angles. Thus, the change in the thickness along the direction of minor axis, i.e., the cross section ratio of the larger width to the smaller width in the minor axis direction, can be observed in this manner. For instance, in the isolated particle slightly tilted upward in the right side as observed in the center portion of the micrographs given in FIGS. 6 to 8, it can be seen that the maximum minor axis length is 0.0458 $\mu$m for a tilting angle of +45° (FIG. 6), 0.0456 $\mu$m for a tilting angle of 0° (FIG. 7), and 0.0271 $\mu$m for a tilting angle of 45° (FIG. 8). Accordingly, the maximum width can be presumed to be found at an angle between those shown in FIGS. 6 and 7. In this manner, measurements on the smallest width length and the largest width length were made on 100 particles by taking the tilting angle into consideration, and the mean largest width was divided by the mean smalleest width to obtain the cross section ratio in the minor axis direction, and was found that the iron oxyhydroxide used as the specimen in the present case was composed of flat acicular particles having a cross section ratio in the minor axis direction of 1.7 in average.

Further according to FIGS. 6 to 8, it can be seen that most of the particles are free from branching. By counting the number of branched particles, inclusive of those exhibiting small branching, the number is found to be as small as three out of 1,000 particles, and this shows that the particles are substantially free from branching.

The fact that each of the constituent particles is free from branching and that is a flat acicular particle signifies that the powder as a whole when used in the lower layer of the magnetic tape contributes to the improvement in surface smoothness and in increasing the strength of the tape. More specifically, the particles free from branching are apt to be densely compacted when being coated, and this leads to a smoother surface and an increase in the strength of the tape. Furthermore, the fact that the particles are each flat and acicular signifies that a wider flat plane can be easily formed on the surface, since the particles are superposed each other at the time of its coating, thereby leading to the formation of a smooth surface. Conclusively, the surface smoothness and the tape strength are improved because less components are distributed perpendicular to the support plane while most of them are densely arranged as having an orientation toward the longitudinal direction of the tape.

In particular, in case the iron oxyhydroxide is a powder composed of fine flat acicular particles having a major axis length of 0.15 $\mu$m or less and capable of being densely compacted, a tape having an extremely favorable surface smoothness can be realized by forming a coating using this powder dispersed in a resin binder. When compared with other types of materials used in the lower layer, a powder composed of fine flat acicular particles having a major axis length of 0.5 $\mu$M or less is characterized in that the particles each have an extremely small minor axis length with a large aspect ratio, and hence, the particles can be favorably orientated in the longitudinal direction of the tape when coated, thereby providing a tape which not only exhibits a smooth surface but also a high tape strength.

Furthermore, in case the iron oxyhydroxide contains Al at a proper quantity, the heat resistance and storage stability thereof can be improved. If the Al content is in a range of from 0.1 to 30% by weight, the powder of iron oxyhydroxide can be maintained stably free from deterioration even in case the temperature is elevated during the drying step in the process for forming a tape. If the content of Al is less than 0.1% by weight, the effect of incorporating Al is insufficiently exhibited. On the other hand, Al incorporated in excess of 30% by weight increases the specific surface area of the powder to unfavorably impair the dispersibility. In case Al is incorporated in the form of a compound, the content of Al refers to the content of elementary Al, and not to the content of the Al compound.

In order to incorporate Al into the iron oxyhydroxide, there can be used compounds such as a water-soluble salt of Al, e.g., $Al_2(SO_4)_3$, $Al(NO_3)_3$, and $AlCl_3$, etc., or a water-soluble aluminate such as $NaAlO_2$ (sodium aluminate). To coat the surface of a particle of iron oxyhydroxide with Al by using such aluminum compounds, the iron oxyhydroxide formed by the aforementioned ripening can be treated with those Al compounds. More specifically, for instance, these Al compounds may be dissolved in an alkaline aqueous solution, and after dispersing the iron oxyhydroxide in the solution, gaseous carbon dioxide or an acid may be added therein for neutralization. Otherwise, an alkaline aqueous solution containing dissolved therein any of the Al compounds above may be added into the suspension of iron oxyhydroxide, and gaseous carbon dioxide may be blown therein or an acid may be added therein. In this manner, the particles can be coated (covered) with Al compound in the form of a crystalline or amorphous $Al_2O_3 \cdot nH_2O$ (hydrated aluminum oxide).

On the other hand, by providing the Al compounds above to be present at the precipitation of iron oxyhydroxide during ripening, there can be obtained iron oxyhydroxide particles containing Al incorporated therein (occluded or impregnated) in the form of a solid solution. For instance, the ripening described above may be carried out by adding any of the Al compounds above in a suspension containing a colloid of ferric hydroxide, or by adding any of the Al compounds above into the solution at forming, or at the step prior to forming, the colloid of ferric hydroxide. By carrying out the ripening above in the presence of dissolved Al in this manner, favorable flat acicular iron oxyhydroxide particles can be obtained further advantageously; furthermore, the iron oxyhydroxide containing therein Al in the form of solid solution yields a higher decomposition temperature, and yet more, further stabilizes the strength.

The surface properties of the particles comprising the powder according to the present invention can be controlled by using other elements such as a Si compound. In case of incorporating Si, the amount of addition thereof is in a range of from 0.1 to 30% by weight. If Si is incorporated into particles of iron oxyhydroxide, for instance, an aqueous solution containing Si, e.g., sodium silicate or potassium silicate; or a water suspension such as a suspension of colloidal silica or a No. 3 water glass; is added into the suspension containing the iron oxyhydroxide, and the pH of the resulting product is controlled to a value 9 or lower. In case of incorporating both of Al and Si, preferably the addition thereof in total is controlled to fall in a range of from 0.1 to 30% by weight. The content of Si as referred herein does not signify the content of the Si compound, but is the content reduced to elemental Si.

It has been found that the decomposition temperature of iron oxyhydroxide when heated in air is affected by the content of Al incorporated in the iron oxyhydroxide. A higher decomposition temperature for a powder provides an advantageous effect in case the powder is used in calender step, because the generation of bubbles can be prevented from occurring. In the calender process involved in fabricating a magnetic tape, in general, the temperature of the coated film is elevated to a range of from 50 to 150° C.; in some instances, the temperature may reach a far higher temperature. If iron oxyhydroxide undergoes decomposition in such cases, bubbles generate inside the coated film as to form irregularities on the surface of the lower layer. This may result in a practically unfeasible magnetic tape, because not only such irregularities formed in the lower layer lead to the formation of irregularities on the surface of the magnetic layer formed thereon, but also the magnetic tape containing bubbles generated therein are practically unacceptable. Accordingly, the powder of iron oxyhydroxide of the present invention is suitable for use as a powder incorporated in the lower layer from the viewpoint that the danger of generating bubbles during the calender process can be avoided.

Figure 9:
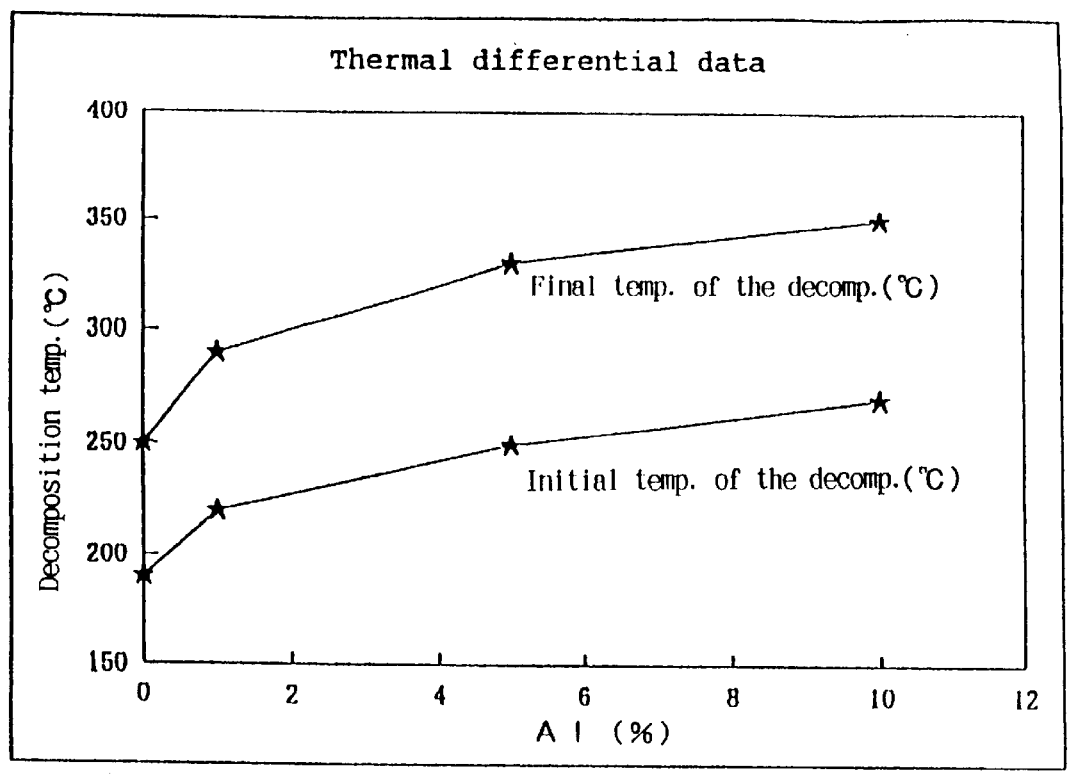
FIG. 9 is a diagram showing the relation between the decomposition temperature of the iron oxyhydroxide and the Al content in the iron oxyhydroxide.

In FIG. 9 is given a graph showing the change in the initial temperature and the final temperature of the decomposition with differing content of Al (by weight %), that is, the content of Al covering (adhering to) the iron oxyhydroxide particles. The decomposition temperature herein is obtained by using a differential thermal analyzer in accordance with the method standardized in JIS K 7120. The curve connecting the measured values plotted by stars in FIG. 9 is deduced from the values. As can be understood from the curve, both the initial temperature and the final temperature of the decomposition increase with increasing content of Al. The representative values for the initial temperature of the decomposition are given below. It has been found furthermore that the initial temperature of the decomposition is elevated for particles containing Al in the form of solid solution (impregnated) as compared with those containing Al covered the surface of the particles more specifically, referring to FIG. 9, the decomposition temperatures for the particles containing Al in the form of solid solution yields a curve relatively shifted to the higher temperature side).

| Al content of iron oxyhydroxide particles (% by weight) | Initial temperature of decomposition (° C.) |
|---|---|
| 0 | 190 |
| 1 | 220 |
| 5 | 250 |
| 10 | 270 |

The quantity of discharged $H_2O$ at 100° C. of the powder according to the present invention for use in the lower layer of the coating type magnetic recording medium must be in a range of from 0.1 to 2.0% by weight. The term "quantity of discharged $H_2O$" as referred herein signifies the total water content discharged from the powder maintained at 100° C. under the atmospheric pressure; in other words, the powder is required to contain a proper amount of water mixed into the resin binder at room temperature, but not to contain water in an excessively high amount. The water content discharged at 100° C. can be obtained in accordance with the principle of measuring water according to Karl Fischer's method.

If the powder discharges water at 100° C. at an amount of less than 0.1% by weight, it cannot be favorably dispersed in resin binder, and this makes it difficult to form a non-magnetic lower layer having a uniform thickness, because portions differing in density form in the layer. On the other hand, if the amount of water discharged at 100° C. exceeds 2.0% by weight, there is also produced portions in which the powder is favorably dispersed and other portions in which the powder is insufficiently dispersed. In this case again, accordingly, portions differing in density form inside the coating, and the formation of uniform non-magnetic lower layer becomes unfeasible. If the water content exceeds 3% by weight, it is no longer possible to obtain a tape by using the powder.

A powder having a water content as such that the amount of discharge at 100° C. falls in a range of from 0.1 to 2.0% by weight can be obtained by an operation process as follows. More specifically, in the final stage of the process for producing the powder, the cake obtained by filtration and rinsing is dried at a predetermined temperature, and, after incorporating water vapor at the predetermined concentration into a carrier gas, e.g., gaseous nitrogen or dry air, the carrier gas is introduced into the cake at a constant temperature to maintain the cake in contact with the gas for a predetermined duration of time. In this manner, a powder having the desired water content can be obtained.

In case of forming a lower layer using the powder of an iron oxyhydroxide according to the present invention in a coating type magnetic recording medium having a multi-layer structure, there is no particular limitation concerning the magnetic powder for constituting the upper magnetic layer. However, it is preferred to use a metallic magnetic powder consisting of flat acicular particles. A powder having the following composition as well as size and shape below can be mentioned as a representative example of a favorable powder.

Specifically, the upper magnetic layer is preferably formed by using a ferromagnetic powder containing iron as the main component together with more than 5% by atomic (abbreviated as wt. % hereinafter) but not more than 50 at. % of Co, from 0.1 to 30 at. % of Al, from 0.1 to 10 at. % of a rare earth (inclusive of Y), 0.05% by weight (abbreviated as wt. % hereinafter) or less of an element belonging to Group 1a of the periodic table (e.g., Li, Na, K, etc.), and 0 to 0.1 wt. % of an element belonging to Group 2a of the periodic table (Mg, Ca, Sr, and Ba), and consisting of flat acicular particles having a mean major axis length of from 0.01 to 0.40 μm and a crystallite size as determined by X-ray diffraction (Dx) in a range of from 50 to 250 Å, provided that the cross section area cut along a direction perpendicular to the major axis has a longer width and a shorter width, with a cross section having a larger width to smaller width ratio of greater than 1, preferably 1.5 or higher, and with a $\sigma_s$/Dx ratio of 0.7 or higher, wherein, $\sigma_s$, represents the saturation magnetization and Dx represents the crystallite size determined by X-ray diffraction.

The ferromagnetic powder above may be such having a discharge $H_2O$ content at 100° C. of 2.0% by weight or less, a discharge $H_2O$ content at 300° C. of 4.0% by weight or less, a true density of 5.55 g/cm$^3$ or higher, a specific surface area as determined by BET method in a range of from 30 to 70 m$^2$/g, a saturation magnetization ($\sigma_s$) of 100 to 200 emu/g, and a coercive force in a range of from 1,200 to 3,000 (Oe), provided that the drop in saturation magnetization ($\sigma_s$) after allowing to stand for 1 week at 60° C. under a relative humidity of 90% is 15% or lower.

Since a ferromagnetic powder above contains the components above and has a relation between size and shape, it enables a magnetic layer suitable for high density recording. That is, a magnetic layer well-balanced in both shape retentability and magnetic properties can be formed by the fine particles having a characteristic size and shape that the average major axis length thereof is in a range of from 0.01 to 0.40 μm and that the particles are flat and acicular. Since the flat acicular iron oxyhydroxide according to the present invention provides a lower layer having excellent surface smoothness and a sufficiently high tape strength, the magnetic layer can be made thinner and hence, a magnetic recording medium having a high performance never achieved by the conventional medium can be produced.

As a support for forming thereon a magnetic recording medium having a multilayer structure by providing a lower and an upper layer, usable are known films such those made of polyesters, e.g., polyethylene terephthalate, polyethylene naphthalate, etc., or of polyolefins, cellulose acetate, polycarbonate, polyamide, polyimide, polyamide imide, polysulfone aramide, aromatic polyamide, etc.

EXAMPLES

First, the methods for measuring the characteristic values shown in the examples below are described.

The mean major axis length, mean minor axis, and the axial ratio were each given as a mean value obtained on 100 particles in an electron micrograph taken under a magnification of 108,000 times.

The cross section ratio in the minor axis direction was obtained by taking a plurality of electron micrographs on the same portion of the same sample while tilting the sample holder by taking the tilting angle into consideration and measuring the smallest width as well as the largest width in the minor axis direction; thus, the measurements were made on 100 particles, and the mean largest width was divided by the mean smallest width to obtain the cross section ratio in the minor axis direction.

The crystallite diameter (which is denoted by Dx in Table 1) was determined by obtaining the half band width of a peak corresponding to the (110) crystallographic plane on a X-ray diffraction profile using a diffractometer, and then calculating the crystallite diameter by substituting Scherrer's equation.

The specific surface area (referred to in Table 1 as "BET") was measured in accordance with BET method. The amount of absorbed stearic acid (referred to in Table 1 as "STA") was determined by first dispersing the powder sample in a MEK solution containing 2% of stearic acid, and after allowing the powder sample to settle in the solution by using a centrifugal separator, the concentration of the supernatant liquid was obtained to calculate the absorbed amount per specific surface area. For the amount of resin absorption (referred to in Table 1 as "resin"), the procedure for obtaining the amount of stearic acid absorption was followed, except for using a MIBK solution containing 2% of a polyurethane resin. The pH value of the powder (referred to in Table 1 as "pH") was obtained in accordance with the method described in JIS K5101. Similarly, the tap density (referred to in Table 1 as "TAP") was obtained according to JIS K5101.

The water content of the powder was obtained from the weight change at 100° C. (or at 300° C.) according to Karl Fischer's method. The decomposition temperature was obtained by reading the initial temperature and the final temperature from a data taken by differential thermal analysis.

The surface smoothness was evaluated by measuring the roughness Ra of the surface of the lower layer of the tape by using a three-dimensional fine profiler (Model ET-30HK) manufactured by Kosaka Laboratory Co., Ltd.

Example 1

To an aqueous solution containing 0.5 mol of $Fe^{3+}$ (an aqueous solution of ferric sulfate), an aqueous solution of sodium hydroxide was added at an equivalent value of 1.1 with respect to $Fe^{3+}$ ion while stirring and maintaining the temperature of the solution to 10° C. to thereby produce precipitates. Then, the suspension containing the precipitates (neutralization precipitates) was held at 40° C. for a time duration of 12 hours (ripened) to obtain deposits of iron oxyhydroxide. To the thus obtained suspension of iron oxyhydroxide, sodium aluminate and an aqueous solution of water glass were added such that the concentration of Al and Si therein should become 1.0 wt. % and 0.5 wt. %, respectively. Then, the pH value of the resulting suspension was adjusted to 9 or lower to cover iron oxyhydroxide with Al compound and Si compound. The resulting suspension was filtered thereafter by a conventional method, and after rinsing and drying, the thus obtained powder was held for 30 minutes at 60° C. in a flowing gaseous nitrogen containing 2% by volume of water vapor to control the water content.

The powder thus obtained consisted of flat acicular particles having a mean major axis length of 0.10 μm, an average axial ratio of 5.8, and a cross section ratio of 1.5, and the specific surface area as obtained by BET method of the powder was found to be 90 m²/g. Thus, a paint was prepared by mixing the following components.

| | |
|---|---|
| Iron oxyhydroxide | 100 parts by weight |
| Polyurethane resin | 20 parts by weight |
| Methyl ethyl ketone | 165 parts by weight |
| Cyclohexenone | 65 parts by weight |
| Toluene | 165 parts by weight |
| Stearic acid | 1 parts by weight |
| Acetyl acetone | 1 parts by weight |

The paint having the composition above obtained by dispersion for 1 hour in a centrifugal ball mill was applied to a base film made of polyethylene terephthalate by using an applicator, such that a non-magnetic lower layer having a desired thickness of about 3 μm is obtained. The characteristic values of the powder of iron oxyhydroxide thus prepared and the properties of the lower layer resulting therefrom are given in Table 1.

Example 2

The same procedure as described in Example 1 was repeated except for holding the suspension containing the neutralization precipitates at 50° C. and ripened for a time duration of 12 hours. Thus was obtained a powder of iron oxyhydroxide having a specific surface area BET of 75 m²/g and consisting of flat acicular particles having a mean major axis length of 0.15 μm, an average aspect ratio of 6.3, and a cross section ratio of 1.8. The resulting powder was used to prepare a non-magnetic lower layer in the same manner as in Example 1. The characteristic values of the powder of iron oxyhydroxide thus prepared and the properties of the lower layer resulting therefrom are given in Table 1.

Example 3

To an aqueous solution containing 0.5 mol of $Fe^{3+}$ (an aqueous solution of ferric sulfate), sodium aluminate was added at an amount as such to yield an Al/Fe atomic ratio of 0.033, and an aqueous solution of sodium hydroxide was further added therein at an equivalent value of 1.1 with respect to $Fe^{3+}$ ions while stirring and maintaining the temperature of the solution to 10° C. to thereby produce precipitates. Then, the suspension containing the precipitates (neutralization precipitates) was held at 40° C. for a time duration of 12 hours (ripened) to obtain deposits of iron oxyhydroxide consisting of particles impregnated with Al present in the form of a solid solution. To the thus obtained suspension of iron oxyhydroxide, an aqueous solution of water glass was added at such an amount that the Si may be incorporated at a concentration of 0.5 wt. % with respect to iron oxyhydroxide, and the pH of the solution was adjusted to a value of 9 or lower to cover the iron oxyhydroxide with Si compound. Then, the suspension was filtered in accordance with a conventional method, and after rinsing and drying, the thus obtained powder was held for 30 minutes at 60° C. in a flowing gaseous nitrogen containing 2% by volume of water vapor to control the water content thereof.

The powder thus obtained consisted of flat acicular particles having a mean major axis length of 0.10 $\mu$m, an average axial ratio of 5.8, and a cross section ratio of 1.6, and the specific surface area BET of the powder was found to be 95 $m^2/g$. The characteristic values of the powder of iron oxyhydroxide thus prepared and the properties of the lower layer resulting therefrom are given in Table 1.

Comparative Example 1

To a mixed solution consisting of an aqueous solution containing 0.625 mol of $Na_2CO_3$ and an aqueous solution containing 0.45 mol of NaOH was added an aqueous solution containing 0.5 mol of $Fe^{2+}$, and after performing ripening by maintaining the resulting solution at 40° C. for a time duration of 90 minutes, air was introduced therein at 40° C. to obtain the precipitate of iron oxyhydroxide. Then, to the suspension containing the iron oxyhydroxide, an aqueous solution of sodium aluminate and an aqueous solution of water glass were added as such that the Al content and Si content with respect to iron oxyhydroxide would become 1.0 wt. % and 0.5 wt. %, respectively, and the pH value of the resulting solution was adjusted to a value of 9 or lower to cover the iron oxyhydroxide particles with Al compound and Si compound. The resulting suspension was filtered in accordance with a conventional method, and after rinsing and drying, the water content of the thus obtained powder was controlled.

The resulting particles were round acicular particles having a round cross section area in the minor axis direction, having a major axis length of 0.10 $\mu$m, an average axial ratio of 5.0, and a cross section ratio of 1.0. Thus, by using the powder, a non-magnetic lower layer was prepared in the same manner as in Example 1. The characteristic values of the powder of iron oxyhydroxide thus prepared and the properties of the lower layer resulting therefrom are given in Table 1.

TABLE 1

| Example No. | Major axis length $\mu$m | Minor axis length $\mu$m | Axial ratio | Cross section ratio in minor axis direction | BET $m^2/g$ | Dx Å | Al content wt. % | Si content wt. % | STA $mg/m^2$ | Resin absorption $mg/m^2$ |
|---|---|---|---|---|---|---|---|---|---|---|
| Ex. 1 | 0.10 | 0.018 | 5.8 | 1.5 | 90 | 75 | 1.0 | 0.5 | 0.70 | 1.00 |
| Ex. 2 | 0.15 | 0.024 | 6.3 | 1.8 | 75 | 85 | 1.0 | 0.5 | 0.70 | 1.05 |
| Ex. 3 | 0.10 | 0.018 | 5.8 | 1.6 | 95 | 70 | 1.0 | 0.5 | 0.70 | 1.00 |
| Comp. Ex. 1 | 0.10 | 0.020 | 5.0 | 1.0 | 120 | 85 | 1.0 | 0.5 | 1.00 | 1.03 |

| Example No. | pH | TAP $g/cm^3$ | Water content at 100° C. (Wt %) | Initial temperature of decomposition ° C. | Tape characteristics Roughness Å | Tape characteristics Strength mg |
|---|---|---|---|---|---|---|
| Ex. 1 | 8.5 | 0.55 | 1.0 | 220 | 95 | 100 |
| Ex. 2 | 8.5 | 0.52 | 1.0 | 225 | 100 | 105 |
| Ex. 3 | 8.5 | 0.56 | 1.0 | 250 | 90 | 100 |
| Comp. Ex. 1 | 9.0 | 0.55 | 1.0 | 195 | 130 | 85 |

From the results shown in Table 1, the lower layer prepared by using the powder of iron oxyhydroxide according to the present invention yields a smaller surface roughness as compared with that of lower layer using those of comparative example 1. Accordingly, it can be understood that the lower layer prepared by using the powder of the present invention has an excellent surface smoothness and yields a sufficiently high strength.

Example 4

The same procedure as described in Example 3 was repeated except for changing the ripening conditions (i.e., the ripening temperature) of the suspension containing the neutralization precipitates. The cross section ratio in the minor axis direction of each of the powders (A to E) and the characteristics of the lower layer using the powders are shown in Table 2. The major axis length and the minor axis length of each of the powders were substantially the same as those of the powder obtained in Example 3, and the axial ratio is about 5.8. Although the measurements were not performed, the powder characteristics of the powders can be considered to be the same as those of the powder obtained in Example 3 except for the cross section ratio in the minor axis direction as shown in Table 2.

In the present example, the powder packing properties (packing properties in the coating) in the thus obtained lower coating film were evaluated in the following manner. The results are also given in Table 2.

Evaluation of the packing properties in the coating: Sample pieces each 8 mm in width ($T_W$) and 100 mm in length ($T_L$) were precisely prepared from each of the coated lower layer prepared in the same manner as in Example 1, and the weight (W) of each of the sample pieces was weighed by using an electronic balance (manufactured by SARTORIUS Co., Ltd.). Separately, a part of each of the coated films of the sample specimens was removed from the base film by using acetone, and the step difference (i.e., the thickness of the coated film, $T_t$) between the exposed base film and the coated film was measured by using a surface roughness meter (Model SurfCom 550A, manufactured by Tokyo Seimitsu Co. Ltd.). Then, the powder packing density (unit: g/cm$^3$) in the coated film was obtained in accordance with the following equation. The thus obtained value is used as the packing properties in the coating. The greater this value, the higher the amount of powder filled into the coated film. Packing density in coating (g/cm$^3$)=$W/(T_W \times T_L \times T_t)$

TABLE 2

| | Ripening temperature ° C. | Cross section ratio in minor axis direction | Tape characteristics | | |
|---|---|---|---|---|---|
| | | | Surface roughness Å | Tape strength mg | Packing density in coating g/cm$^3$ |
| A | 30 | 1.3 | 126 | 86 | 1.9 |
| B | 33 | 1.4 | 122 | 87 | 2.0 |
| C | 35 | 1.5 | 100 | 98 | 2.8 |
| D | 45 | 1.7 | 90 | 100 | 3.0 |
| E | 50 | 1.8 | 90 | 100 | 3.3 |
| Control: Comp. Ex. 1 | | 1.0 | 130 | 85 | 1.8 |

Figure 10:
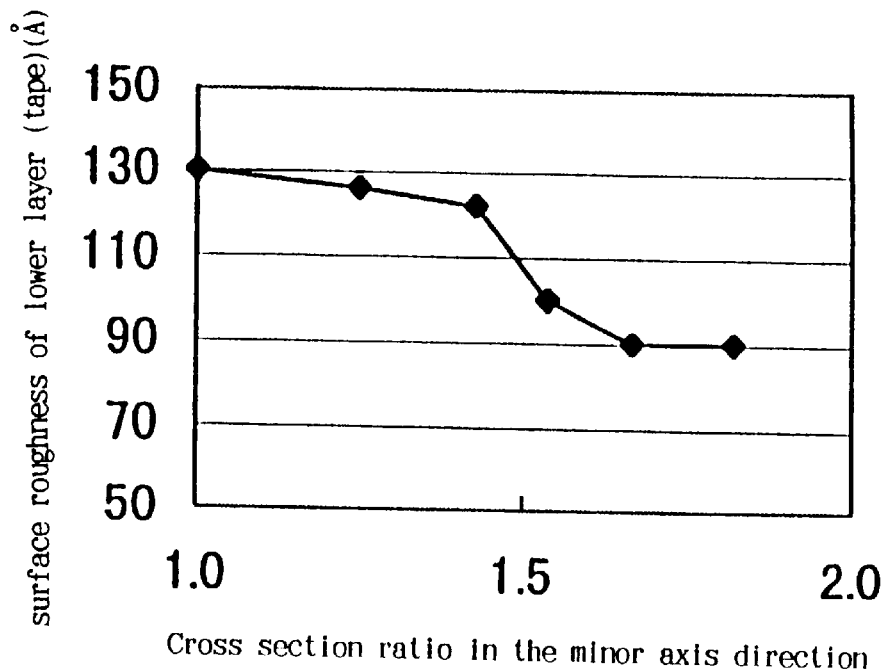
FIG. 10 is a diagram showing the relation between the surface roughness of a lower layer (a tape) using the flat acicular particles and the cross section ratio in minor axis direction of the particle.
Figure 11:
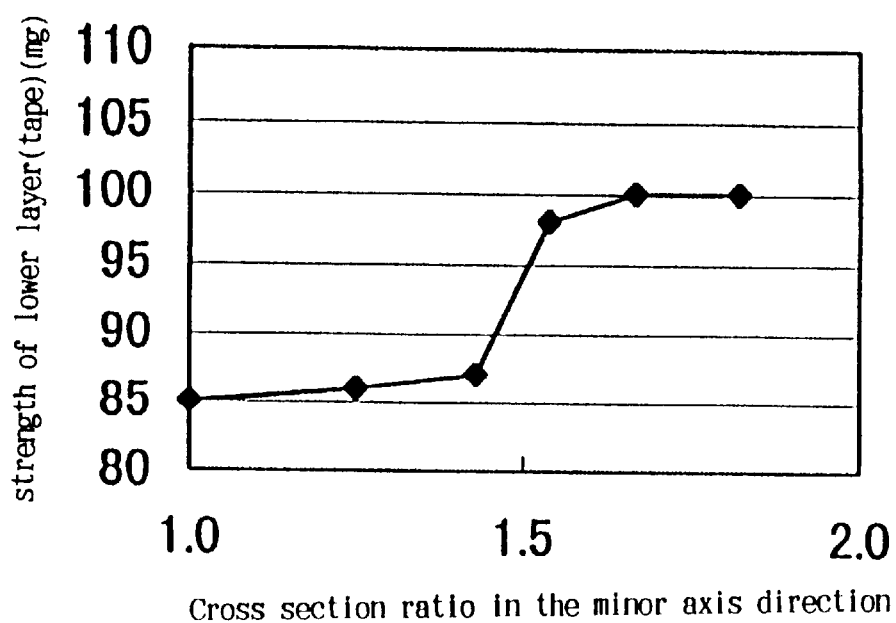
FIG. 11 is a diagram showing the relation between the strength of a lower layer (a tape) using the flat acicular particles and the cross section ratio in the minor axis direction of the particle.

From the results shown in Table 2, it can be understood that the cross section ratio in the minor axis direction of the finally obtained iron oxyhydroxide changes with changing ripening conditions of the suspension containing the precipitates (neutralization precipitates), and that an iron oxyhydroxide having the desired cross section ratio in the minor axis direction can be obtained by properly controlling the ripening conditions. Furthermore, it can be also understood that the surface roughness and the strength of the tape are improved by increasing the cross section ratio in the minor axis direction. To make this point clearer, the relation obtained in the present example were shown by plotting the results in FIGS. 10 and 11. From those figures, it can be understood that the surface roughness and the strength are particularly improved when the cross section ratio in the minor axis direction exceeds the vicinity of 1.5. Furthermore, it can be seen that the powder packing properties in the coating is improved with increasing cross section ratio in the minor axis direction, and that the packing density in the coating increases as the particles of the powder becomes more flat and acicular.

As described above, the powder for use in a lower layer of a coating type magnetic recording medium according to the present invention enables non-magnetic layers improved in surface smoothness and strength, and thereby realizes a magnetic recording medium having a multilayer structure suitable for high density recording.

What is claimed is:

1. A powder for use in the lower layer of a magnetic recording medium, comprising acicular particles with a mean major axis length in a range of from 0.01 to 0.5 µm and a mean minor axis length in a range of from 0.01 to 0.05 µm, provided that the acicular particles are flat acicular particles which, when cut in a direction perpendicular to the major axis, exhibit a cross section having a larger width $W_L$ and a smaller width $W_S$, wherein the ratio $W_L/W_S$ is not less than 1.4, and that the quantity of discharged $H_2O$ at 100° C. is in a range of from 0.1 to 2.0% by weight.

2. A powder for use in the lower layer of a coating type magnetic recording medium as claimed in claim 1, wherein the flat acicular particles comprise iron oxyhydroxide.

3. A powder for use in the lower layer of a coating type magnetic recording medium as claimed in claim 1, wherein the flat acicular particles are substantially free from branching and the powder has a specific surface area in a range of from 10 to 300 m$^2$/g.

4. A powder for use in the lower layer of a coating type magnetic recording medium as claimed claim 1, wherein the powder contains from 0.1 to 30% by weight of Al.

5. A powder for use in the lower layer of a coating type magnetic recording medium as claimed in claim 1, wherein the powder contains from 0.1 to 30% by weight of Si.

6. A powder for use in the lower layer of a coating type magnetic recording medium as claimed in claim 1, wherein the powder contains Al and Si at an amount of from 0.1 to 30% by weight in total.

7. A powder for use in the lower layer of a coating type magnetic recording medium as claimed in claim 1, wherein the powder has a tap density of 0.4 g/cm$^3$ or higher.

8. A powder for use in the lower layer of a coating type magnetic recording medium as claimed claim 1, wherein has a decomposition temperature in air of 210° C. or higher.

9. In a method for producing a powder for use in the lower layer of a magnetic recording medium, the method is characterized in that a flat acicular iron oxyhydroxide particles for use in the lower layer of a magnetic recording medium is produced by a process comprising:

adding an alkali hydroxide to an aqueous solution of a ferric salt at an amount equivalent value of 1.0 to 3.5 with respect to Fe$^{3+}$ ion to form neutralized precipitate at a temperature of 5° C. or higher;

allowing a flat acicular iron oxyhydroxide to precipitate by holding the resulting suspension containing the neutralized precipitate at a temperature higher than the former temperature; and separating the resulting precipitated flat acicular iron oxyhydroxide from the suspension.

10. A method for producing flat acicular iron oxyhydroxide particles for use in the lower layer of a coating type magnetic recording medium as claimed in claim 9, wherein the suspension for precipitating the iron oxyhydroxide or the solution prior to the precipitation contains aluminum dissolved therein.

11. A method for producing flat acicular iron oxyhydroxide particles for use in the lower layer of a coating type magnetic recording medium as claimed in claim 9, wherein a water-soluble aluminum salt or an aluminate is added to the solution containing suspended therein the iron oxyhydroxide precipitate.

* * * * *